US010576980B2

(12) United States Patent
Tsuji et al.

(10) Patent No.: US 10,576,980 B2
(45) Date of Patent: Mar. 3, 2020

(54) TRAVEL CONTROL DEVICE AND TRAVEL CONTROL METHOD

(71) Applicant: HONDA MOTOR CO., LTD, Minato-ku, Tokyo (JP)

(72) Inventors: Kanta Tsuji, Wako (JP); Kentaro Ishisaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 156 days.

(21) Appl. No.: 15/729,811

(22) Filed: Oct. 11, 2017

(65) Prior Publication Data
US 2018/0105171 A1   Apr. 19, 2018

(30) Foreign Application Priority Data
Oct. 14, 2016   (JP) .................. 2016-202380

(51) Int. Cl.
*B60W 30/14*    (2006.01)
*B60W 10/20*    (2006.01)
(Continued)

(52) U.S. Cl.
CPC ....... *B60W 30/146* (2013.01); *B60K 31/0008* (2013.01); *B60W 10/04* (2013.01);
(Continued)

(58) Field of Classification Search
CPC .... B60W 30/146; B60W 10/20; B60W 10/04; B60W 10/18; B60W 30/14; B60W 30/09;
(Continued)

(56) References Cited

U.S. PATENT DOCUMENTS 6,405,132 B1 * 6/2002 Breed ................... B60N 2/002
701/301
9,950,707 B2 * 4/2018 Tan ................... B60W 50/0098
(Continued)

FOREIGN PATENT DOCUMENTS

JP    2011-084165    4/2011
JP    2013-216141    10/2013
(Continued)

OTHER PUBLICATIONS

Japanese Office Action for Japanese Patent Application No. 2016-202380 dated May 8, 2018.

*Primary Examiner* — Mussa A Shaawat
(74) *Attorney, Agent, or Firm* — Amin, Turocy & Watson, LLP

(57) ABSTRACT

A vehicle control device includes a travel control processing unit configured to control traveling of a host vehicle in accordance with an automated driving mode, where a travel control for the vehicle is performed at least partially automatically by way of automated driving, or a manual driving mode, where traveling of the vehicle is performed based on an operating device which is operated by a vehicle occupant, and an operation amount acquisition unit for acquiring an operation amount by which the operating device is operated by the vehicle occupant. On the basis of the operation amount acquired by the operation amount acquisition unit when switching from the manual driving mode to the automated driving mode, the travel control processing unit sets a first O/R threshold value for the operation amount at a time of canceling at least a portion of the automated driving mode.

10 Claims, 7 Drawing Sheets

(51) Int. Cl.
  *B60W 30/12* (2006.01)
  *B60K 31/00* (2006.01)
  *B60W 10/18* (2012.01)
  *B60W 10/04* (2006.01)
  *B60W 30/09* (2012.01)
  *G01S 13/93* (2020.01)
  *G01S 13/931* (2020.01)
  *B60W 50/00* (2006.01)

(52) U.S. Cl.
  CPC ............ *B60W 10/18* (2013.01); *B60W 10/20* (2013.01); *B60W 30/09* (2013.01); *B60W 30/12* (2013.01); *B60W 30/14* (2013.01); *B60W 30/143* (2013.01); *B60K 2031/0016* (2013.01); *B60W 2050/0075* (2013.01); *B60W 2540/10* (2013.01); *B60W 2540/12* (2013.01); *B60W 2540/18* (2013.01); *B60W 2540/20* (2013.01); *B60W 2720/106* (2013.01); *G01S 2013/935* (2013.01); *G01S 2013/9321* (2013.01); *G01S 2013/9346* (2013.01); *G01S 2013/9353* (2013.01)

(58) Field of Classification Search
  CPC ............... B60W 30/143; B60W 30/12; B60W 2540/20; B60K 31/0008; B60K 2031/0016; G01S 2013/9346; G01S 2013/935
  See application file for complete search history.

(56) References Cited

U.S. PATENT DOCUMENTS

| | | | |
|---|---|---|---|
| 2003/0191568 A1* | 10/2003 | Breed | B60W 40/06 701/36 |
| 2005/0060069 A1* | 3/2005 | Breed | B60N 2/2863 701/408 |
| 2009/0093938 A1* | 4/2009 | Isaji | B60W 10/184 701/96 |
| 2011/0015818 A1* | 1/2011 | Breuer | B60T 8/17558 701/31.4 |
| 2014/0067206 A1* | 3/2014 | Pflug | B60W 10/04 701/41 |
| 2015/0266490 A1* | 9/2015 | Coelingh | B60W 50/082 701/30.5 |
| 2015/0284008 A1* | 10/2015 | Tan | B60W 50/0098 701/28 |
| 2016/0231746 A1* | 8/2016 | Hazelton | G05D 1/0257 |
| 2016/0304089 A1* | 10/2016 | Miura | B60W 30/08 |
| 2017/0032197 A1* | 2/2017 | Sim | B60R 1/00 |
| 2017/0212515 A1* | 7/2017 | Bertollini | B60Q 9/00 |
| 2017/0277182 A1* | 9/2017 | May | B60W 50/087 |
| 2017/0329331 A1* | 11/2017 | Gao | B60W 50/0098 |
| 2018/0001892 A1* | 1/2018 | Kim | B60W 30/095 |
| 2018/0022358 A1* | 1/2018 | Fung | B60W 40/08 701/36 |
| 2018/0047285 A1* | 2/2018 | Johnson | B60W 50/14 |
| 2018/0093666 A1* | 4/2018 | Kim | B60W 30/16 |
| 2018/0093668 A1* | 4/2018 | Kim | B60W 30/16 |
| 2018/0096605 A1* | 4/2018 | Bai | G08G 1/166 |
| 2018/0098040 A1* | 4/2018 | Murao | G02B 5/201 |
| 2018/0232156 A1* | 8/2018 | Kim | G06F 3/0611 |
| 2018/0292833 A1* | 10/2018 | You | B60W 30/182 |
| 2019/0025825 A1* | 1/2019 | Takahama | B60W 50/14 |

FOREIGN PATENT DOCUMENTS

| | | |
|---|---|---|
| JP | 2014-091349 | 5/2014 |
| JP | 2016-141258 | 8/2016 |

\* cited by examiner

TRAVEL CONTROL DEVICE AND TRAVEL CONTROL METHOD

CROSS-REFERENCE TO RELATED APPLICATION

This application is based upon and claims the benefit of priority from Japanese Patent Application No. 2016-202380 filed on Oct. 14, 2016, the contents of which are incorporated herein by reference.

BACKGROUND OF THE INVENTION

Field of the Invention

The present invention relates to a travel control device and a travel control method for executing an acceleration/deceleration control to automatically accelerate and decelerate a vehicle using a target vehicle velocity, and a turning control to automatically control turning of the vehicle.

Description of the Related Art

An acceleration/deceleration control (or a "cruise control") for automatically accelerating and decelerating a user's own vehicle (also referred to herein as a "host vehicle") using a target vehicle velocity is known (for example, see Japanese Laid-Open Patent Publication No. 2013-216141 (hereinafter referred to as "JP2013-216141A")). JP2013-216141A has the object of providing an easy to use cruise control device for a vehicle, which is capable of accelerating and decelerating the vehicle without causing a feeling of discomfort when changing a previously set vehicle velocity (see paragraph [0006], abstract).

In order to achieve such an object, JP2013-216141A (refer to the abstract) discloses a cruise control device 1 in which traveling of the vehicle is controlled so that the travel velocity of the vehicle becomes the set vehicle velocity Vs. The set vehicle velocity Vs is set by a set/coast switch 11, as shown in FIG. 1 (see paragraphs [0016], [0002]). In the cruise control device 1, the set vehicle velocity Vs can be variably set by voice recognition using a microphone 6 (see abstract). Further, it is possible to set the acceleration/deceleration As when the set vehicle velocity Vs is set and when changing the travel velocity of the vehicle to the set vehicle velocity Vs, on the basis of the degree of opening of the accelerator at the time of setting the set vehicle velocity Vs by voice recognition, or to set the acceleration/deceleration As in advance in a navigation system 14 (see abstract).

Further, a deviation suppression control (or a road departure prevention control) which avoids or suppresses a departure of the vehicle from a travel lane is known (see, for example, Japanese Laid-Open Patent Publication No. 2011-084165 (hereinafter referred to as "JP2011-084165A")). JP2011-084165A has the object of providing a road departure prevention device in which a sufficient effect is obtained with respect to a control for preventing departure from a road, and together therewith, which does not impart a feeling of discomfort to the driver in relation to stopping the control for preventing the departure from the road (see paragraph [0006], abstract).

In order to achieve this object, according to JP2011-084165A (refer to the abstract), a controller 1 determines whether or not a host vehicle deviates from the travel lane based on a traveling state of the host vehicle. Further, if a rumble strip is provided on the boundary of a road, or at an end of the lane on the road on which the vehicle is traveling, and imparts vibrations to the vehicle, and in the event that such a rumble strip is detected, the controller 1 implements a road departure prevention operation that causes braking and driving forces to be generated by a vehicle system 6 so as to avoid a departure from the lane. The controller 1 corrects a base threshold value to be low, so that the road departure prevention operation is easily suspended, on the basis of an operation of the driver, and when the operation amount exceeds the threshold value, the road departure prevention operation by the vehicle system 6 is terminated.

According to JP2011-084165A, if a driving operation amount exceeds a predetermined base threshold value, the road departure prevention control, which is carried out by a braking and driving force control means, is stopped (see claim 1).

SUMMARY OF THE INVENTION

As described above, an acceleration/deceleration control (or a cruise control) is disclosed in JP2013-216141A, and a departure suppression control is disclosed in JP2011-084165A. However, neither JP2013-216141A nor JP2011-084165A offers an investigation of a combined method in which an acceleration/deceleration control (or a cruise control) and a departure suppression control are used in combination. Further, in JP2013-216141A and JP2011-084165A, no consideration is given to a combined method in which an acceleration/deceleration control is used in combination with a turning control apart from a departure suppression control (for example, an obstacle avoidance control to avoid obstacles existing on a travel path of the host vehicle).

The present invention has been devised taking into consideration the aforementioned problems, and an object of the present invention is to provide a travel control device and a travel control method, which are capable of suitably combining an acceleration/deceleration control (or a cruise control) and a departure suppression control or the like.

A travel control device according to the present invention comprises an acceleration/deceleration control unit configured to execute an acceleration/deceleration control to automatically carry out acceleration and deceleration of a host vehicle, a travel lane detecting unit configured to detect a travel lane of the host vehicle, and a turning control unit configured to automatically control turning of the host vehicle. The turning control unit includes at least one of a departure suppression unit which, when it is determined that a future or actual departure of the host vehicle with respect to the travel lane will occur or is occurring, is configured to execute a departure suppression control to carry out a departure suppression process to suppress the future or actual departure, and an avoidance control unit configured to execute an obstacle avoidance control to carry out an avoidance process to avoid an obstacle that exists in a travel path of the host vehicle, wherein the acceleration/deceleration control unit is configured to limit acceleration of the host vehicle when the departure suppression process or the avoidance process is initiated.

According to the present invention, when the departure suppression process or the avoidance process is initiated, by limiting the acceleration of the host vehicle, priority is placed on the departure suppression process or the avoidance process rather than on acceleration of the host vehicle. Therefore, it is possible to improve the stability of the host vehicle during the departure suppression process or the avoidance process, or to reduce the need for a new departure suppression process or a new avoidance process immediately after the departure suppression process or the avoidance process has been performed.

When the departure suppression process or the avoidance process is completed or interrupted, the acceleration/deceleration control unit may be configured to relax a limitation on acceleration. In accordance with this feature, it is possible to reinitiate a normal acceleration/deceleration control at an early stage after the departure suppression process or the avoidance process has been performed.

The acceleration/deceleration control unit may be configured to change a method of relaxing the limitation on acceleration, depending on content of the departure suppression process or the avoidance process. In accordance with this feature, it is possible to appropriately relax the limitation on acceleration according to the content of the departure suppression process.

The departure suppression process or the avoidance process is configured to include automatic braking. Further, in a case that the automatic braking is executed during the departure suppression process or the avoidance process, the acceleration/deceleration control unit may be configured to change the method of relaxing the limitation on acceleration depending on an operation history of an automatic brake. In accordance with this feature, it is possible to appropriately relax the limitation on acceleration according to the operation history of the automatic brake.

An operation detecting sensor may be provided, which is configured to detect presence or absence of a driving operation by a driver. The acceleration/deceleration control unit may be configured to change the method of relaxing the limitation on acceleration, depending on the presence or absence of the driving operation during the departure suppression process or the avoidance process. The presence or absence of a driving operation during the departure suppression process or the avoidance process can be regarded as indicating a degree to which the driver is concentrating on driving. Therefore, it is possible to suitably relax the restriction on acceleration in accordance with the degree to which the driver is concentrating on driving.

In a case that automatic braking was executed and the driving operation was not performed during the departure suppression process or the avoidance process, the acceleration/deceleration control unit may be configured to change the method of relaxing the limitation on acceleration depending on an operation time period or a number of operations of the automatic brake in the departure suppression process or the avoidance process. The operation time or the number of times that the automatic brake is operated in the departure suppression process or the avoidance process can be regarded as indicative of the degree of necessity for departure suppression or avoidance actually or in the future. Therefore, it is possible to appropriately relax the limitation on acceleration in accordance with the degree of necessity for an actual or future departure suppression or avoidance.

The change in the method of relaxing the limitation on acceleration can be a change in an amount of relaxation per unit time. In accordance with this feature, by adjusting the time of returning to the normal acceleration/deceleration control, it is possible to suitably relax the limitation on acceleration.

The acceleration/deceleration control unit may be configured to increase an amount of relaxation per unit time, in a case that automatic braking was executed and the driving operation was performed during the departure suppression process or the avoidance process, as compared with a case of not performing the driving operation during the departure suppression process or the avoidance process. In accordance with this feature, it is possible to suitably relax the restriction on acceleration in accordance with the presence or absence of a driving operation made by the driver, and the presence or absence of automatic braking.

The acceleration/deceleration control unit may be configured to increase an amount of relaxation per unit time, in a case that automatic braking is not executed during the departure suppression process or the avoidance process, as compared with a case of executing automatic braking during the departure suppression process or the avoidance process. In accordance with this feature, in the case that automatic braking is not executed, the vehicle velocity can be promptly made to reach the target velocity.

Alternatively, after the departure suppression process or the avoidance process has been terminated or suspended, the acceleration/deceleration control unit may be configured to continue to limit the acceleration until the driving operation is detected, and relax the limitation on acceleration when the driving operation is detected. In accordance with this feature, it is possible to arouse the attention of the driver by continuing to limit the acceleration of the vehicle until the driver concentrates on driving.

The driving operation, for example, may be an operation indicative of an acceleration operation or an intention to accelerate by the driver. In accordance with this feature, it is possible to accelerate after having first confirmed the intention of the driver to accelerate.

When limiting the acceleration of the host vehicle, the acceleration/deceleration control unit may be configured to perform a deceleration control to cause the host vehicle to decelerate, or perform a braking control for generating a braking force with respect to the host vehicle. In accordance with this feature, by carrying out deceleration or braking while the limitation on acceleration is in progress, the deviation suppression process or the obstacle avoidance process can be performed in a more suitable manner.

A travel control method according to the present invention is a method in which a travel control device is used, wherein the travel control device is configured to execute an acceleration/deceleration control to automatically carry out acceleration and deceleration of a host vehicle, and a turning control to automatically control turning of the host vehicle. The turning control includes at least one of a departure suppression control which, when it is determined that a future or actual departure of the host vehicle with respect to a travel lane of the host vehicle will occur or is occurring, carries out a departure suppression process to suppress the future or actual departure, and an obstacle avoidance control which carries out an avoidance process to avoid an obstacle that exists on a travel path of the host vehicle, wherein acceleration of the host vehicle is limited when the departure suppression process or the avoidance control is initiated.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A. Embodiment

<A-1. Configuration>

[A-1-1. Overall Configuration]

Figure 1:
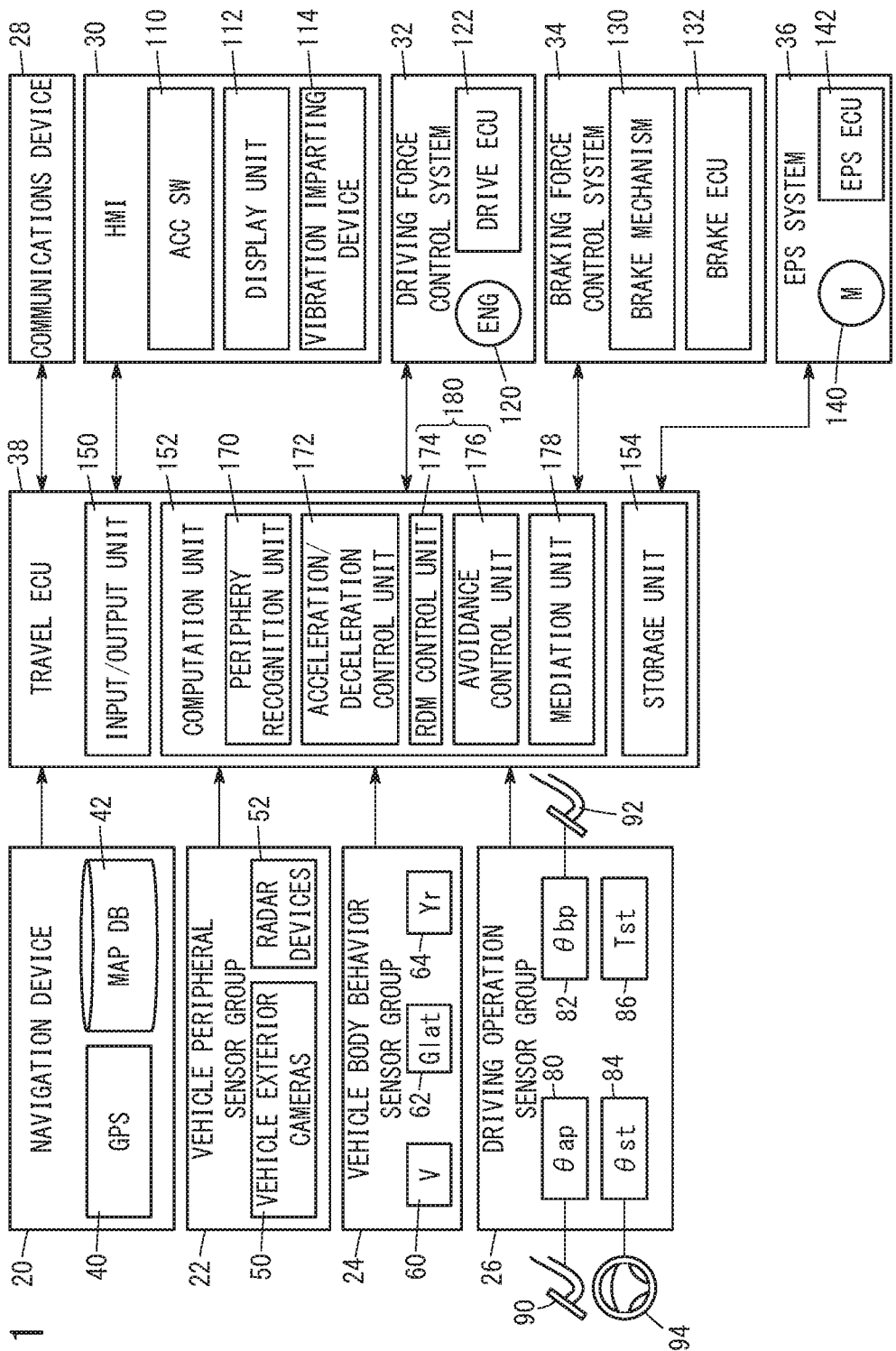
FIG. 1 is a block diagram showing a configuration of a vehicle including a travel electronic control unit serving as a travel control device according to an embodiment of the present invention.

FIG. 1 is a block diagram showing the configuration of a vehicle 10 including a travel electronic control unit 38 (hereinafter referred to as a "travel ECU 38" or an "ECU 38") as a travel control device according to an embodiment of the present invention. In addition to the travel ECU 38, the vehicle 10 (hereinafter also referred to as a "host vehicle 10") includes a navigation device 20, a vehicle peripheral sensor group 22, a vehicle body behavior sensor group 24, a driving operation sensor group 26, a communications device 28, a human-machine interface 30 (hereinafter referred to as an "HMI 30"), a driving force control system 32, a braking force control system 34, and an electric power steering system 36 (hereinafter referred to as an "EPS system 36").

[A-1-2. Navigation Device 20]

The navigation device 20 performs route guidance for manual driving or automatic driving along a planned route Rv of the host vehicle 10 to a target destination point Pgoal. The navigation device 20 includes a global positioning system sensor 40 (hereinafter referred to as a "GPS sensor 40"), and a map database 42 (hereinafter referred to as a "map DB 42"). The GPS sensor 40 detects the current position Pcur of the vehicle 10. Road map information (map information Imap) is stored in the map DB 42.

[A-1-3. Vehicle Peripheral Sensor Group 22]

The vehicle peripheral sensor group 22 detects information in relation to the periphery of the vehicle 10 (hereinafter also referred to as "vehicle peripheral information Ic"). The vehicle peripheral sensor group 22 includes a plurality of vehicle exterior cameras 50 and a plurality of radar devices 52.

The plurality of vehicle exterior cameras 50 output image information Iimage obtained by capturing images of the periphery (front, sides, and rear) of the vehicle 10. The plurality of radar devices 52 output radar information Iradar indicative of reflected waves with respect to electromagnetic waves transmitted around the periphery (front, sides, and rear) of the vehicle 10. The vehicle exterior cameras 50 and the radar devices 52 serve as periphery recognition devices that recognize the vehicle peripheral information Ic.

[A-1-4. Vehicle Body Behavior Sensor Group 24]

The vehicle body behavior sensor group 24 detects information (hereinafter also referred to as "vehicle body behavior information Ib") in relation to the behavior of the vehicle 10 (in particular, the vehicle body). The vehicle body behavior sensor group 24 includes a vehicle velocity sensor 60, a lateral acceleration sensor 62, and a yaw rate sensor 64.

The vehicle velocity sensor 60 detects the vehicle velocity V [km/h] of the vehicle 10. The lateral acceleration sensor 62 detects the lateral acceleration Glat [m/s/s] of the vehicle 10. The yaw rate sensor 64 detects the yaw rate Yr [rad/s] of the vehicle 10.

[A-1-5. Driving Operation Sensor Group 26]

The driving operation sensor group 26 detects information (hereinafter also referred to as "driving operation information Io") in relation to driving operations performed by the driver. In the driving operation sensor group 26, there are included an accelerator pedal sensor 80, a brake pedal sensor 82, a steering angle sensor 84, and a steering torque sensor 86.

The accelerator pedal sensor 80 (hereinafter also referred to as an "AP sensor 80") detects an operation amount θap (hereinafter also referred to as an "AP operation amount θap") [%] of an accelerator pedal 90. The brake pedal sensor 82 (hereinafter also referred to as a "BP sensor 82") detects an operation amount θbp (hereinafter also referred to as a "BP operation amount θbp") [%] of a brake pedal 92. The steering angle sensor 84 detects a steering angle θst (hereinafter also referred to as an "operation amount θst") [deg] of a steering wheel 94. The steering torque sensor 86 detects a steering torque Tst [N·m] applied to the steering wheel 94.

[A-1-6. Communications Device 28]

The communications device 28 performs wireless communications with an external device. In this instance, the external device may include, for example, a non-illustrated external server. The external server may include, instead of the navigation device 20, a route guidance server for calculating in detail a planned route Rv, and a traffic information server for providing traffic information to the vehicle 10.

Moreover, although it is assumed that the communications device 28 of the present embodiment is mounted (or fixed at all times) in the vehicle 10, the communications device 28 may be, for example, a device that can be carried to locations outside of the vehicle 10, such as a mobile phone or a smart phone.

[A-1-7. HMI 30]

The HMI 30 accepts operations input from a vehicle occupant, together with presenting various information to the vehicle occupant visually, audibly, and tactilely. The HMI 30 includes an ACC switch 110 (hereinafter also referred to as an "ACC SW 110"), a display unit 112, and a vibration imparting device 114. The accelerator pedal 90, the brake pedal 92, and the steering wheel 94 may be positioned as portions of the HMI 30.

The ACC SW 110 is a switch for issuing instructions to initiate and terminate the auto cruise control (ACC) by operations of the vehicle occupant, together with setting a target vehicle velocity Vacctar (fixed value) for use in the ACC control. In addition to or in place of the ACC SW 110, it is also possible to instruct the initiation and termination of the ACC by other methods (such as voice input via a non-illustrated microphone). The display unit 112 includes, for example, a liquid crystal panel or an organic EL panel. The display unit 112 may also be configured in the form of a touch panel. The vibration imparting device 114 imparts vibrations to the steering wheel 94 on the basis of a command from the travel ECU 38.

[A-1-8. Driving Force Control System 32]

The driving force control system 32 includes an engine 120 (drive source) and a drive electronic control unit 122 (hereinafter referred to as a "drive ECU 122"). The aforementioned AP sensor 80 and the accelerator pedal 90 may also be positioned as portions of the driving force control system 32. The drive ECU 122 executes a driving force control for the vehicle 10 using the AP operation amount θap, etc. When the driving force control is implemented, the drive ECU 122 controls a travel driving force Fd of the vehicle 10 through the control of the engine 120.

[A-1-9. Braking Force Control System 34]

The braking force control system 34 includes a brake mechanism 130 and a brake electronic control unit 132 (hereinafter referred to as a "brake ECU 132"). The aforementioned BP sensor 82 and the brake pedal 92 may also be positioned as portions of the braking force control system 34. The brake mechanism 130 actuates a brake member by a brake motor (or a hydraulic mechanism) or the like.

The brake ECU 132 executes a braking force control for the vehicle 10 using the BP operation amount θbp, etc. When the braking force control is implemented, the brake ECU 132 controls the braking force Fb of the vehicle 10 through the control of the brake mechanism 130, etc.

[A-1-10. EPS System 36]

The EPS system 36 includes an EPS motor 140 and an EPS electronic control unit 142 (hereinafter referred to as an "EPS ECU 142" or an "ECU 142"). The aforementioned steering angle sensor 84, the steering torque sensor 86, and the steering wheel 94, and the vibration imparting device 114 may also be positioned as portions of the EPS system 36.

The EPS ECU 142 controls the EPS motor 140 according to commands from the travel ECU 38, and thereby controls a turning amount R of the vehicle 10. In the turning amount R, there are included the steering angle θst, the lateral acceleration Glat, and the yaw rate Yr.

[A-1-11. Travel ECU 38]

(A-1-11-1. Outline of Travel ECU 38)

The travel ECU 38 is a device that executes the various controls (travel controls) in relation to traveling of the vehicle 10, and includes a central processing unit (CPU), for example. The travel controls include the auto cruise control (ACC), and the road departure mitigation (RDM) control. Details concerning the ACC and RDM controls will be described later.

As shown in FIG. 1, the ECU 38 includes an input/output unit 150, a computation unit 152, and a storage unit 154. Moreover, portions of the functions of the travel ECU 38 can be borne by an external device existing externally of the vehicle 10.

(A-1-11-2. Input/Output Unit 150)

The input/output unit 150 performs input and output operations with respect to devices apart from the ECU 38 (the navigation device 20, the sensor groups 22, 24, 26, the communications device 28, etc.). The input/output unit 150 includes a non-illustrated A/D conversion circuit that converts input analog signals into digital signals.

(A-1-11-3. Computation Unit 152)

The computation unit 152 carries out calculations based on signals received from the navigation device 20, the respective sensor groups 22, 24, 26, the communications device 28, the HMI 30, and the ECUs 122, 132, 142, etc. In addition, based on the calculation results thereof, the computation unit 152 generates signals with respect to the navigation device 20, the communications device 28, the drive ECU 122, the brake ECU 132, and the EPS ECU 142.

As shown in FIG. 1, the computation unit 152 of the travel ECU 38 includes a periphery recognition unit 170, an acceleration/deceleration control unit 172, an RDM control unit 174, an avoidance control unit 176, and a mediation unit 178. These respective components are realized by executing programs stored in the storage unit 154. The programs may be supplied from an external device via the communications device 28. Portions of the programs may also be constituted by hardware (circuit components). The RDM control unit 174 and the avoidance control unit 176 constitute a turning control unit 180 that controls turning of the host vehicle 10.

Figure 6:
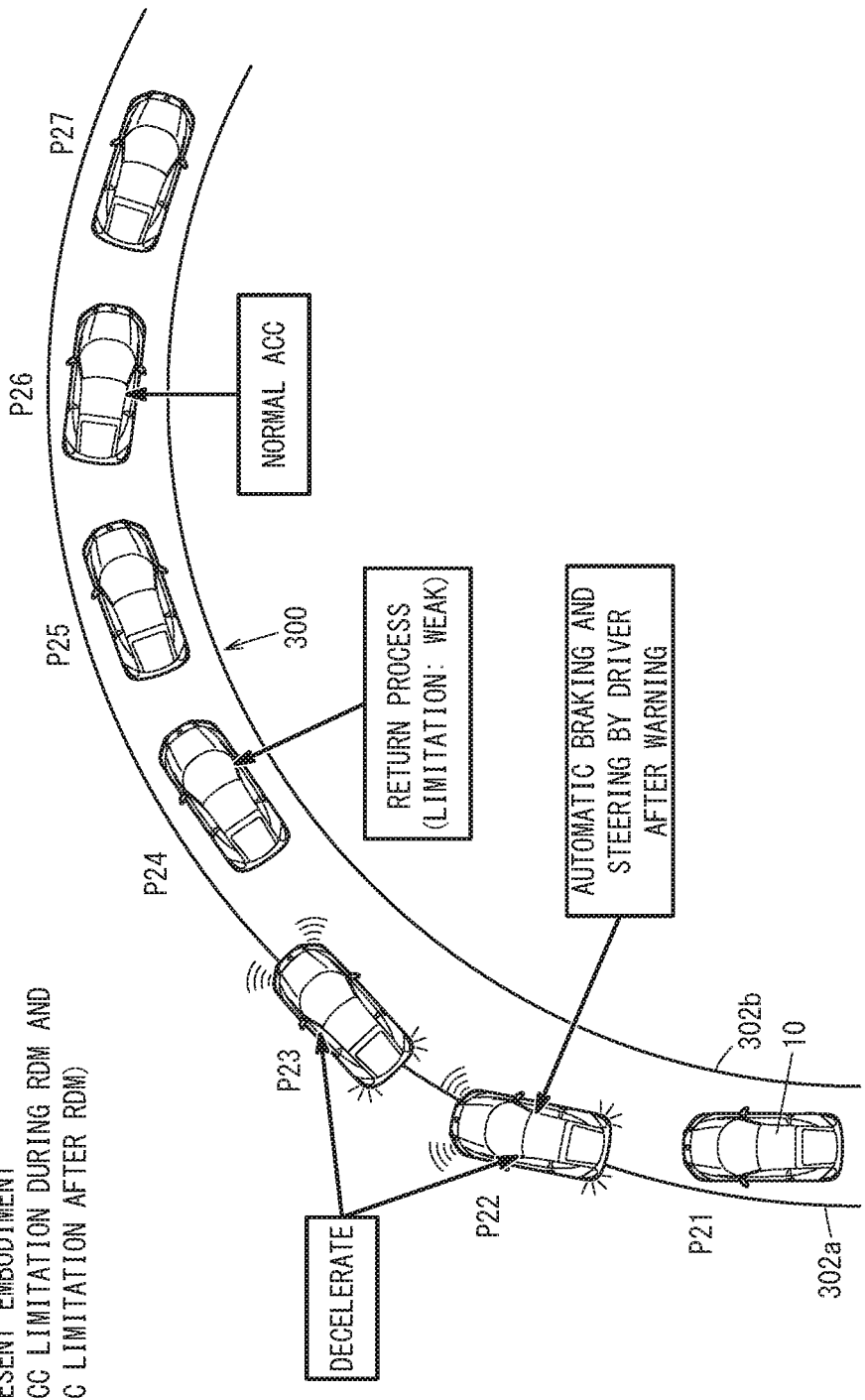
FIG. 6 is a diagram showing movement of a vehicle in the case that the ACC and RDM controls according to the embodiment are used when the vehicle is traveling on a curved road.

The periphery recognition unit (travel lane detecting unit) 170 recognizes lane markings (lane markings 302*a*, 302*b* and the like, as shown in FIG. 6) and peripheral obstacles (a preceding vehicle and the like) on the basis of the vehicle peripheral information Ic received from the vehicle peripheral sensor group 22. For example, the lane markings are recognized based on the image information Iimage. Based on the recognized lane markings, the periphery recognition unit 170 recognizes the travel lane of the vehicle 10 (the travel lane 300 shown in FIG. 6, etc.).

Further, the periphery recognition unit 170 recognizes peripheral obstacles using the image information Iimage and the radar information Iradar. Among the peripheral obstacles, there are included moving objects such as other vehicles, and stationary objects such as buildings, signs, and the like.

The acceleration/deceleration control unit 172 executes an auto cruise control (ACC). ACC is a control to carry out cruising (constant velocity traveling) automatically. More specifically, if there is no preceding vehicle in the travel lane 300 of the host vehicle 10 (see FIG. 6), the vehicle 10 is made to travel at a preset target vehicle velocity Vacctar (fixed value). Further, if there is a preceding vehicle in the travel lane 300 of the host vehicle 10, the vehicle 10 is made to travel in such a manner as to maintain an interval between the host vehicle 10 and the preceding vehicle. In this instance, the interval can be defined by a contact tolerance time (TTC: time to collision) [sec] or a distance [m]. During implementation of the ACC control, the vehicle 10 may be made to travel while adjusting an interval not only between the preceding vehicle and the vehicle 10, but also an interval between a following vehicle and the vehicle 10.

The RDM control unit 174 (departure suppression unit) executes a road departure mitigation (RDM) control. The RDM control is a control to mitigate or suppress a departure of the vehicle 10 from the travel lane 300 (see FIG. 6). Such a departure as referred to herein can include a future departure as well as an actual departure from the travel lane.

The avoidance control unit 176 executes an obstacle avoidance control. The obstacle avoidance control performs an avoidance process to avoid obstacles existing on the travel path of the host vehicle 10. The obstacles referred to herein may include both moving objects such as surrounding vehicles that are undergoing traveling and pedestrians or the like, and stationary objects such as guardrails or surrounding vehicles that are parked. Detection of obstacles is performed using the vehicle exterior cameras 50 and the radar devices 52. For example, in the case that the time to collision (TTC) with an obstacle becomes less than or equal to a predetermined TTC threshold value, the avoidance control unit 176 performs an avoidance process to avoid the obstacle.

In the avoidance process, for example, at least one of providing a notification to the vehicle occupant via the HMI 30, deceleration of the vehicle 10 via the driving force control system 32 and/or the braking force control system 34, and a steering assist via the EPS system 36 is carried out.

The mediation unit 178 carries out mediation between the ACC control by the acceleration/deceleration control unit 172, and the RDM control by the RDM control unit 174. In particular, the content of the ACC control is made to change depending on a case in which the RDM process is being performed by the RDM control, or a case in which the RDM process is not being performed by the RDM control (details thereof will be described later with reference to FIGS. 2 and 3). As will be described later, the mediation unit 178 may carry out mediation between the ACC control performed by the acceleration/deceleration control unit 172, and the obstacle avoidance control performed by the avoidance control unit 176.

(A-1-11-4. Storage Unit 154)

The storage unit 154 stores programs and data used by the computation unit 152. The storage unit 154 includes, for example, a random access memory (hereinafter referred to as a "RAM"). As the RAM, a volatile memory such as a register or the like, and a nonvolatile memory such as a flash memory or the like can be used. Further, in addition to the RAM, the storage unit 154 may have a read only memory (hereinafter referred to as a "ROM").

<A-2. Various Controls of the Present Embodiment>

[A-2-1. Outline of Various Controls]

As described above, the travel ECU 38 of the present embodiment executes the ACC and RDM controls. At that time, the travel ECU 38 mediates between the ACC and RDM controls.

[A-2-2. Auto Cruise Control (ACC)]

As noted previously, the ACC control is a control to carry out cruising (constant velocity traveling) automatically. More specifically, if there is no preceding vehicle in the travel lane 300 of the host vehicle 10 (see FIG. 6), the vehicle 10 is made to travel at a preset target vehicle velocity Vacctar (fixed value). Further, if there is a preceding vehicle in the travel lane 300 of the host vehicle 10, the vehicle 10 is made to travel in such a manner as to maintain an interval between the host vehicle 10 and the preceding vehicle. During implementation of the ACC control, the vehicle 10 may be made to travel while adjusting an interval not only between the preceding vehicle and the vehicle 10, but also an interval between a following vehicle and the vehicle 10.

[A-2-3. RDM Control]

As noted previously, the RDM control is a control to mitigate or suppress a departure of the vehicle 10 from the travel lane 300 (see FIG. 6). Such a departure as referred to herein can include a future departure as well as an actual departure from the travel lane. In the RDM process of the present embodiment, there are included an alarm or warning that provides a notification concerning the possibility of departure, as well as automatic braking. As will be discussed later, the RDM process may also include automatic steering.

[A-2-4. Mediation Between ACC and RDM Controls]

(A-2-4-1. Outline of Mediation)

Figure 2:
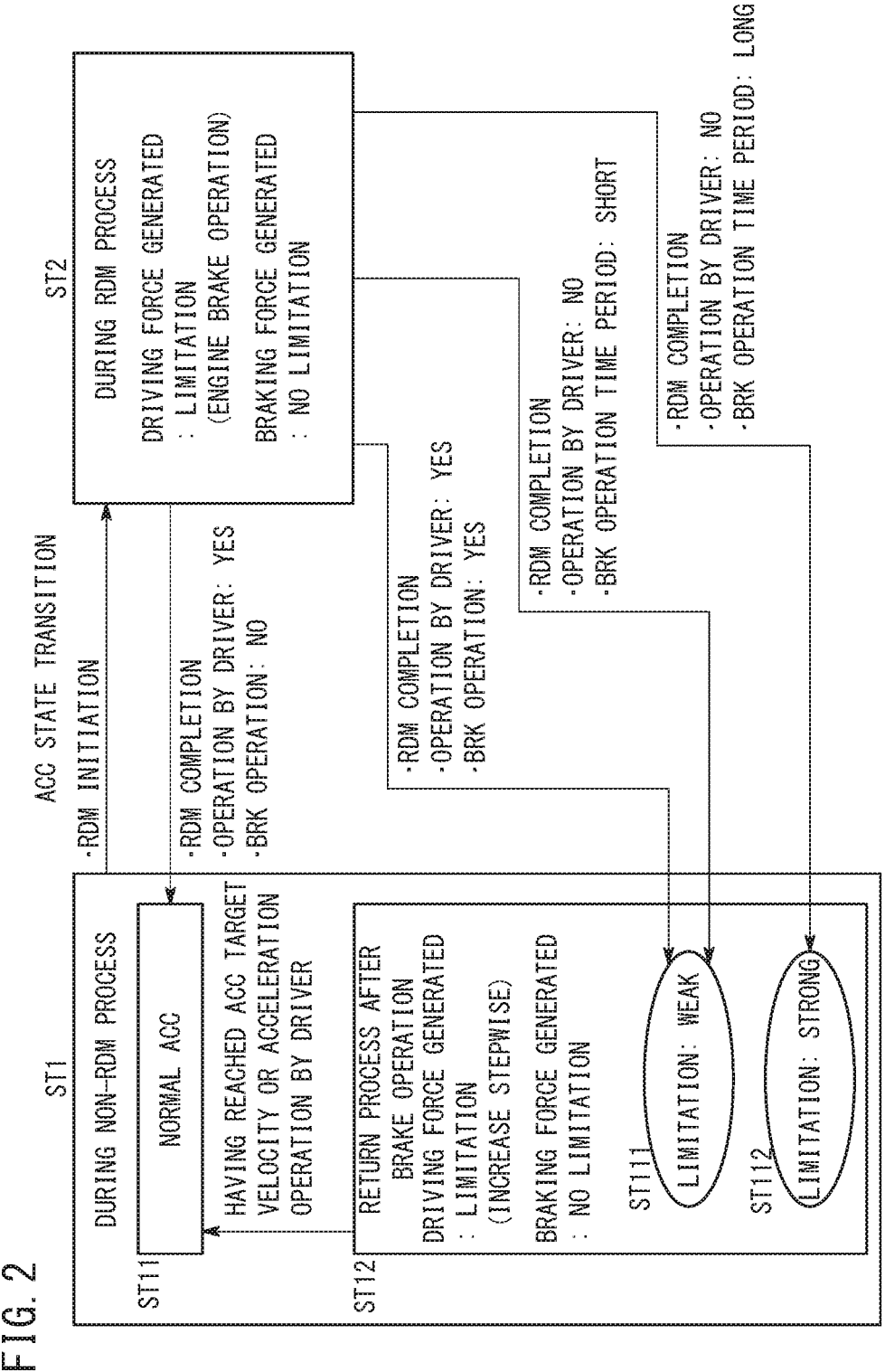
FIG. 2 is a state transition diagram showing the content of an auto cruise control (ACC) in the aforementioned embodiment, in relation to a road departure mitigation (RDM) control.
Figure 3:
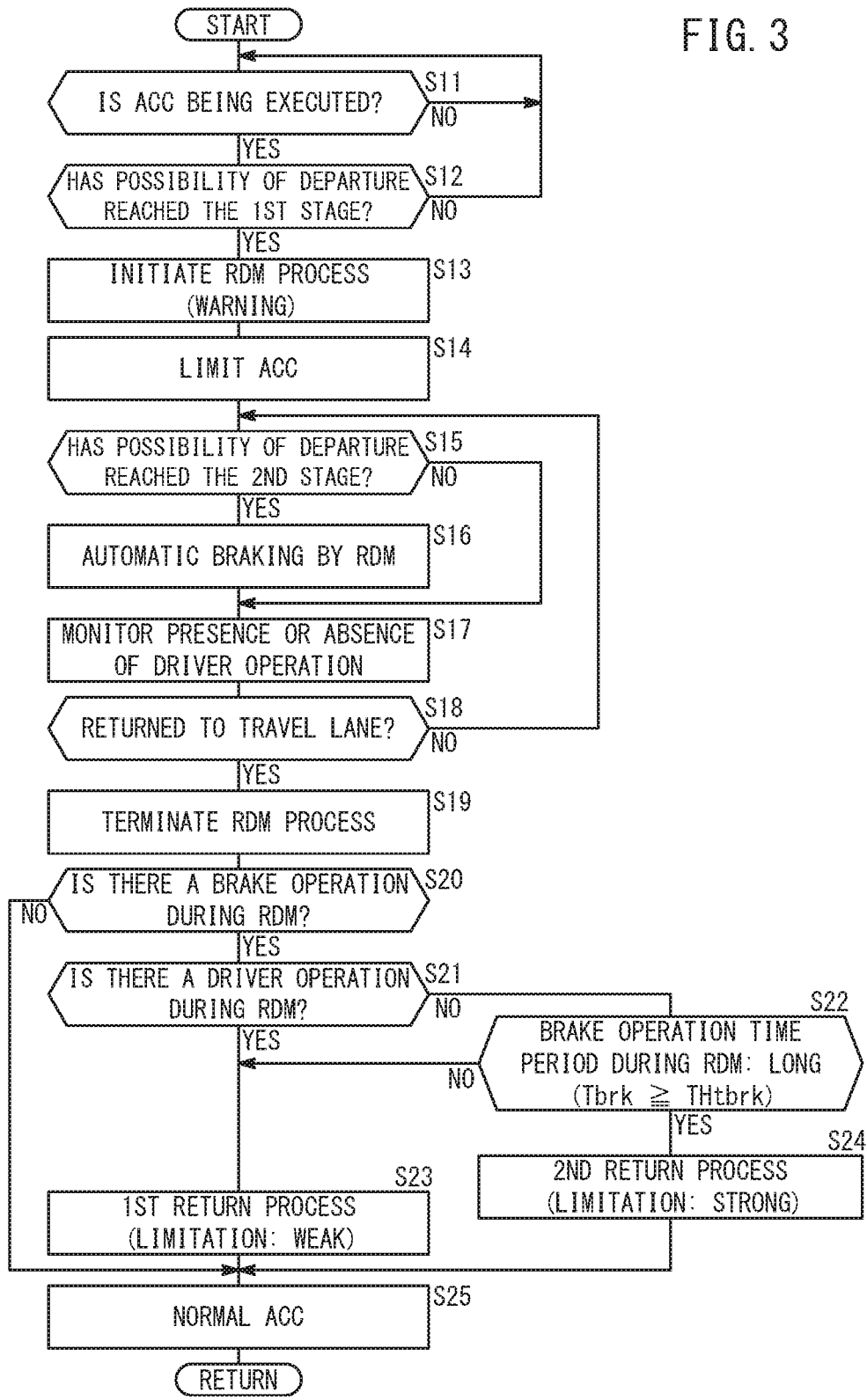
FIG. 3 is a flowchart showing mediation between the ACC and RDM controls in the embodiment.

FIG. 2 is a state transition diagram showing the content of the ACC control in the present embodiment in relation to the RDM control. FIG. 3 is a flowchart showing mediation between the ACC and RDM controls in the present embodiment.

As shown in FIG. 2, as respective states of the ACC control, there are roughly provided a state ST1 (during a time of non-RDM processing) in which the RDM process is not performed, and a state ST2 (during a time of RDM processing) in which the RDM process is performed. Furthermore, in the state ST1, there are included a state ST11 (normal ACC state) in which a normal ACC control is performed, and a state ST12 (state during return process after brake operation) in which a return process is performed after a brake operation accompanying the RDM process. Further still, in the state ST12, there are included a state ST111 (limitation: weak state) in which the suppression of acceleration (the limitation on acceleration) is weakened during the return process, and a state ST112 (limitation: strong state) in which the suppression of acceleration is intensified during the return process.

In step S11 of FIG. 3, the travel ECU 38 determines whether or not the ACC control is being executed. Such a determination is made, for example, based on whether or not the ACC switch 110 has been turned on. In the case that the ACC control is being executed (S11: YES), the process proceeds to step S12 (state ST1 of FIG. 2). In the case that the ACC control is not being executed (S11: NO), step S11 is repeated.

In step S12, the ECU 38 determines whether or not the possibility of departure has reached a first stage. In this instance, the first stage is a stage to provide a warning because there is a possibility of departure. The determination of whether or not the possibility of departure has reached the first stage is carried out, for example, by determining whether or not the distance D [m] from a reference position Pref of the vehicle 10 to a nearest lane marking 302a is less than or equal to a first distance threshold value THd1.

The reference position Pref is a portion of the vehicle 10 for the purpose of calculating the distance D with respect to a nearest lane marking (the lane marking 302a in the example of FIG. 6), and for example, is a left tip end of the vehicle 10 with respect to the left side lane marking 302a. With respect to the right side lane marking 302b, the reference position Pref is a right tip end of the vehicle 10.

The first distance threshold value THd1 (hereinafter also referred to as a "threshold value THd1") is a threshold value for determining the possibility of a future departure. Even if a relative positional relationship between the reference position Pref of the vehicle 10 and the lane marking 302a is the same, the determination of whether or not the vehicle 10 deviates from the lane marking 302a changes depending on the vehicle velocity V, the orientation of the vehicle 10 (or the vehicle body), the lateral acceleration Glat, the yaw rate Yr, and the steering angle θst at that time. Therefore, the threshold value THd1 may be made variable in accordance with at least one of the vehicle velocity V, the angle A of the vehicle 10 with respect to the lane marking 302a, the lateral acceleration Glat, the yaw rate Yr, and the steering angle θst.

In the case that the possibility of departure has reached the first stage (step S12: YES), the process proceeds to step S13 (state ST2 of FIG. 2). If the possibility of departure has not reached the first stage (step S12: NO), then the process returns to step S11.

In step S13, the RDM control unit 174 of the ECU 38 issues an alarm or warning as an RDM process (departure suppression process). In this instance, as such a warning, the ECU 38 displays a warning message on the display unit 112, and together therewith, causes the vibration imparting device 114 to generate vibrations. In addition to or in place of this feature, an alarm sound may be output via a non-illustrated speaker.

In step S14, the mediation unit 178 of the ECU 38 supplies a command with respect to the acceleration/deceleration control unit 172 to limit the ACC control (state ST2 of FIG. 2). Having received such a command, the acceleration/deceleration control unit 172 limits the generation of the travel driving force Fd. By limiting the travel driving force Fd in this instance, engine braking is activated. Accordingly, even if the vehicle velocity V is lower than the target vehicle velocity Vacctar of the ACC control, acceleration by the ACC control is not carried out. Moreover, at this point in time, generation of the braking force Fb by the ACC control is not limited. At the stage of step S14, an automatic brake (step S16), to be described later, may be actuated. Further, in the event that the driver depresses the accelerator pedal

90, the vehicle 10 can be accelerated (in this case, the normal ACC state (step S25) is restored immediately).

In step S15, the ECU 38 determines whether or not the possibility of departure has reached a second stage. In this instance, the second stage is a stage to activate the automatic brake because a departure has occurred or because a departure is likely to occur. The determination of whether or not the possibility of departure has reached the second stage is carried out, for example, by determining whether or not the distance D from the reference position Pref of the vehicle 10 to a nearest lane marking is less than or equal to a second distance threshold value THd2. The second distance threshold value THd2 (hereinafter also referred to as a "threshold value THd2") is a threshold value for determining that a departure has occurred or that a departure is likely to occur. In the same manner as the threshold value THd1, the threshold value THd2 may be made variable in accordance with at least one of the vehicle velocity V, the angle A of the vehicle 10 with respect to the lane marking 302a, the lateral acceleration Glat, the yaw rate Yr, and the steering angle Est.

If the possibility of departure has reached the second stage (step S15: YES), then the process proceeds to step S16. If the possibility of departure has not reached the second stage (step S15: NO), then the process proceeds to step S17.

In step S16, the travel ECU 38 actuates the automatic brake. More specifically, the travel ECU 38 supplies a command with respect to the brake ECU 132 to operate the automatic brake by way of the brake mechanism 130. Upon receiving the command, the brake ECU 132 operates the brake mechanism 130.

In step S17, the ECU 38 monitors the presence or absence of a driving operation by the driver. The driving operation as referred to herein implies an operation of the accelerator pedal 90, the brake pedal 92, and the steering wheel 94. The ECU 38 determines such operations on the basis of outputs from the AP sensor 80, the BP sensor 82, the steering angle sensor 84, and the steering torque sensor 86.

In step S18, the ECU 38 determines whether or not the vehicle 10 has come back (or returned) to the travel lane 300. In the case of having returned to the travel lane 300 (step S18: YES), the process proceeds to step S19. In the case of not having returned to the travel lane 300 (step S18: NO), the process returns to step S15.

In step S19, the ECU 38 terminates the RDM process (departure suppression process). For example, the ECU 38 ends the automatic brake operation (step S16).

In step S20, the ECU 38 determines whether or not braking was implemented during the RDM process. The braking referred to herein implies the automatic braking carried out in step S16. Alternatively, the ECU 38 may determine both the operation of automatic braking in step S16, and braking performed by the driver as monitored in step S17. In the case that braking was not implemented during the RDM process (step S20: NO), the process proceeds to step S25 (ST2→ST11 in FIG. 2). In the case that braking was implemented during the RDM process (step S20: YES), the process proceeds to step S21.

In step S21, the ECU 38 determines whether or not there is an operation of the driver during the RDM process. An operation of the driver as referred to herein implies an operation (driving operation) of the accelerator pedal 90, the brake pedal 92, and the steering wheel 94. If during the RDM process, an operation of the driver was performed (step S21: YES), the process proceeds to step S23. If during the RDM process, there was not an operation of the driver (step S21: NO), then the process proceeds to step S22.

In step S22, the ECU 38 determines whether or not a brake operation time period Tbrk [sec] during the RDM process was long. More specifically, a determination is made as to whether or not the brake operation time period Tbrk is greater than or equal to a time threshold value THtbrk. The brake referred to in the brake operation time period Tbrk implies the automatic braking carried out in step S16. Alternatively, the ECU 38 may determine both non-operation of automatic braking in step S16, and braking performed by the driver as monitored in step S17.

If the answer to step S21 is YES or the answer to step S22 is NO, then in step S23, the ECU 38 executes a return process (first return process) accompanied by a weak limitation applied with respect to acceleration of the vehicle 10 (ST2→ST111 in FIG. 2). The first return process will be described later with reference to FIG. 4.

If the answer to step S22 is YES, then in step S24, the ECU 38 executes a return process (second return process) accompanied by a strong limitation applied with respect to acceleration of the vehicle 10 (ST2→ST112 in FIG. 2). The second return process will be described later with reference to FIG. 4. Moreover, in step S23 or step S24, in the event that the driver performs an acceleration operation (depresses the accelerator pedal 90), the return process is canceled at that time, and the routine transitions (in step S25) to the normal ACC control (ST12→ST11 in FIG. 2).

If the answer in step S20 is NO, or after completion of step S23 or step S24, then in step S25, the ECU 38 executes the normal ACC control (ST2→ST11, or ST2→ST111→ST11, or ST2→ST112→ST11 in FIG. 2). The term "normal" as referred to herein implies not being accompanied by a limitation of the ACC control (including the first and second return processes) during execution of the RDM process.

(A-2-4-2. Return Processes)

As described above, after the RDM process has been terminated (step S19 of FIG. 3), there exist the case of returning immediately to the normal ACC control (step S20: NO→step S25), the case of performing the first return process (step S20: YES→step S21: YES or step S20: YES→step S21: NO→step S22: NO), and the case of performing the second return process (step S20: YES→step S21: NO→step S22: YES).

Further, the first return process (state ST111 in FIG. 2) is a process of returning to the normal ACC control along with a weak limitation applied with respect to acceleration of the vehicle 10. The second return process (state ST112 in FIG. 2) is a process of returning to the normal ACC control along with a strong limitation applied with respect to acceleration of the vehicle 10.

Figure 4:
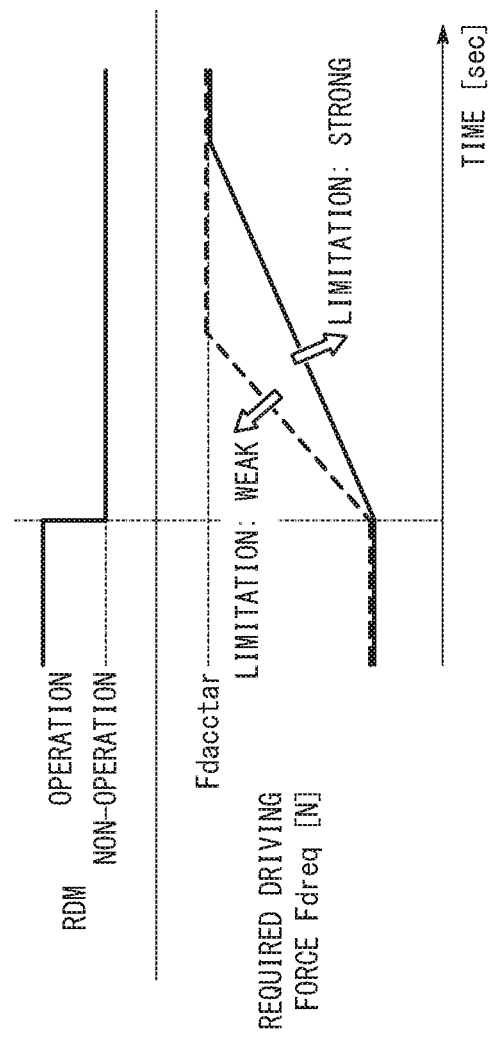
FIG. 4 is a diagram for explaining first and second return processes in the embodiment.

FIG. 4 is a diagram for explaining the first and second return processes in the present embodiment. In FIG. 4, time [sec] is indicated on the horizontal axis, whereas operation or non-operation of the RDM process and a required driving force Fdreq are indicated on the vertical axis. The required driving force Fdreq is a value of the driving force Fd of the vehicle 10 which is required by the ACC control. The ECU 38 controls the output of the engine 120 on the basis of the required driving force Fdreq. More specifically, the travel ECU 38 issues a command to the drive ECU 122 for the required driving force Fdreq, and the drive ECU 122 controls the output of the engine 120 in accordance with the required driving force Fdreq. The value Fdacctar shown in FIG. 4 is the required driving force Fdreq corresponding to the target vehicle velocity Vacctar.

In FIG. 4, the dashed line shows the case of the first return process, and the solid line shows the case of the second return process. A time derivative value (the slope in FIG. 4) of the required driving force Fdreq in the first return process is greater than the time derivative value (the slope in FIG. 4) of the required driving force Fdreq in the second return process. This feature implies that the limitation on acceleration of the vehicle 10 is relatively weak in the first return process, and the limitation on acceleration of the vehicle 10 is relatively strong in the second return process. Stated otherwise, in the first return process, the amount of relaxation per unit time is relatively large, whereas in the second return process, the amount of relaxation per unit time is relatively small.

As described above, in the case that braking is not activated, the normal ACC control is restored immediately after having completed the RDM process (step S19 of FIG. 3) (step S20: NO→step S25). Therefore, in that case, the vehicle velocity V does not diverge substantially from the target vehicle velocity Vacctar of the ACC control. Accordingly, if, after completion of the RDM process (step S19 of FIG. 3), the normal ACC control is restored immediately (step S20 NO→step S25), the time required until the vehicle velocity V reaches the target vehicle velocity Vacctar is comparatively short.

In contrast thereto, in the case of the first return process and the second return process, braking is activated (see step S20 of FIG. 3). Therefore, in that case, the vehicle velocity V diverges relatively from the target vehicle velocity Vacctar of the ACC control. Accordingly, if after completion of the RDM process (step S19 of FIG. 3), the normal ACC control is restored after implementation of the first return process or the second return process, the time required until the vehicle velocity V reaches the target vehicle velocity Vacctar is comparatively long.

In consideration of this point, in the case of the first return process (weak limitation), the time derivative value of the required driving force Fdreq (the slope in FIG. 4) is increased in comparison with a case in which the normal ACC control is restored immediately. Alternatively, in the case of the first return process (weak limitation), the time derivative value of the required driving force Fdreq may be made equal to or smaller in comparison with the case in which the normal ACC control is restored immediately.

Further, in the case of the second return process (strong limitation), the time derivative value of the required driving force Fdreq (the slope in FIG. 4) is decreased in comparison with a case in which the normal ACC control is restored immediately. Alternatively, in the case of the second return process (weak limitation), if the limitation is weaker than the limitation in the first return process, the time derivative value of the required driving force Fdreq may be made equal to or larger in comparison with the case in which the normal ACC control is restored immediately.

(A-2-4-3. Reasons for Difference Between the Limitations on Acceleration)

Next, the reason for distinguishing between the case in which the limitation on acceleration of the vehicle 10 is weakened (the first return process) and the case in which the limitation on acceleration of the vehicle 10 is strengthened (second return process) (and in particular, the reason for providing the second return process) in the present embodiment will be described. The reason the second return process is provided in addition to the first return process is to take into consideration the possibility that the lane markings 302a might be detected erroneously by the travel ECU 38.

More specifically, in the present embodiment, the driver performs steering of the vehicle 10. Provisionally, if the travel ECU 38 were to mistakenly detect a lane marking (lane markings 302a, 302b, etc., in FIG. 6), the driver performs steering so as to travel in the correct travel lane (such as the travel lane 300 shown in FIG. 6). In this case, the ECU 38 determines that the vehicle 10 has departed from the lane markings (which the ECU 38 has mistakenly detected). In addition, the ECU 38 issues an alarm (S13 in FIG. 3) or operates the automatic brake (step S16) by the RDM.

Provisionally, if the ACC control were turned off accompanying operation of the alarm or the automatic brake, and an operation by the driver were required in order to restart the ACC control, in the case that an erroneous detection such as described above occurs, there is a possibility of impairing the convenience of the driver.

Thus, according to the present embodiment, in the case that the brake operation time period Tbrk is long (step S22 of FIG. 3: YES), by strengthening the limitation on acceleration (step S24), both safety and convenience to the driver can be achieved.

(A-2-4-4. Comparison Between Present Embodiment and Comparative Example)

Next, a case will be described in which the present embodiment is compared with a comparative example. In the comparative example discussed herein, during operation of the RDM process, generation of the travel driving force Fd by the ACC control is restricted, and immediately after the RDM process, the normal ACC control is restored.

Figure 5:
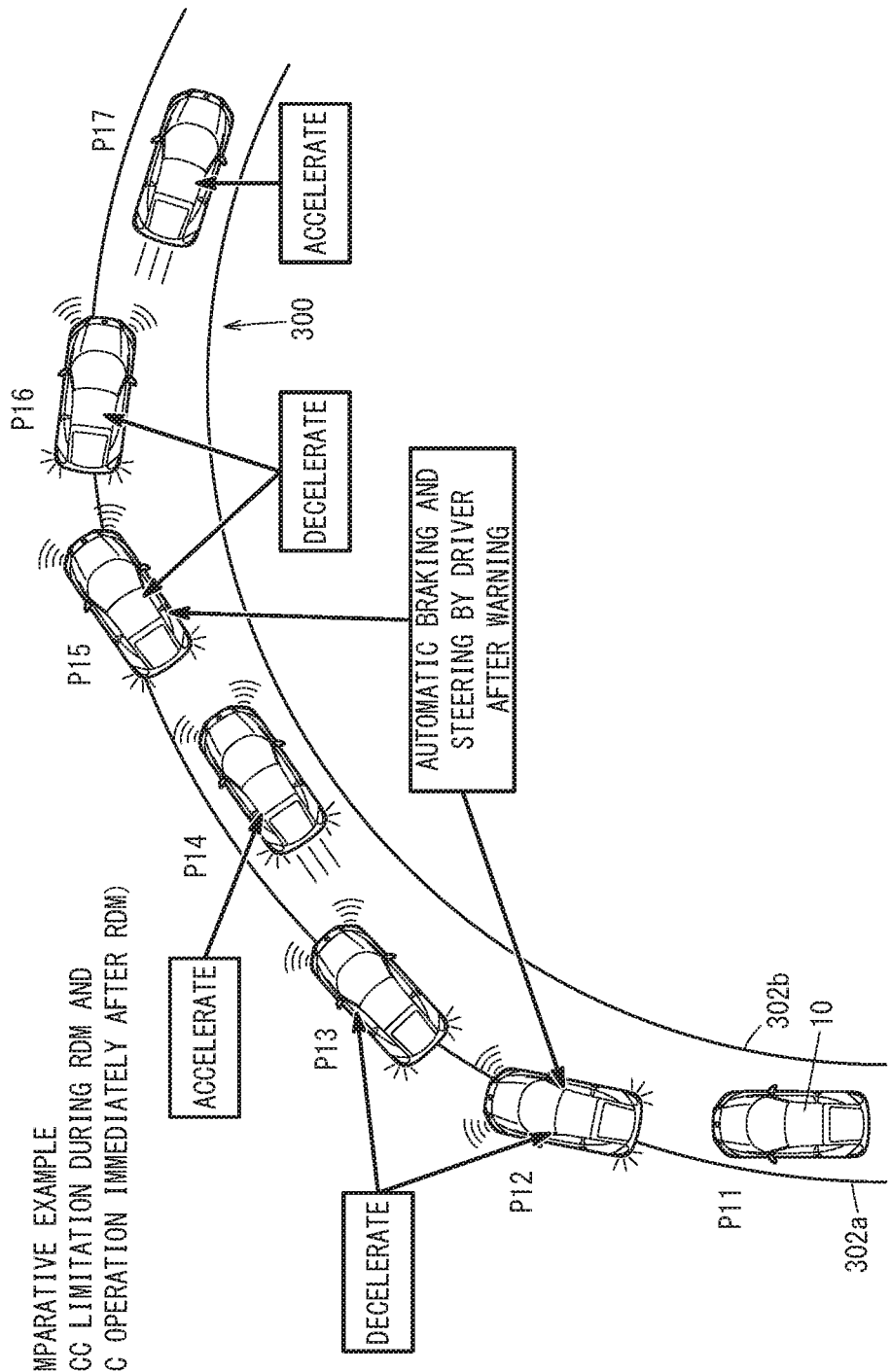
FIG. 5 is a diagram showing movement of a vehicle in the case that the ACC and RDM controls according to a comparative example are used when the vehicle is traveling on a curved road.

FIG. 5 is a diagram showing movement of the vehicle 10 in the case that the ACC and RDM controls according to a comparative example are used when the vehicle 10 is traveling on a curved road 300. In FIG. 5, the curved road 300 forms a travel lane for the vehicle 10. Therefore, the curved road 300 is also referred to as a travel lane 300. The travel lane 300 is specified by the lane markings 302a, 302b. The same features apply to FIG. 6.

Moreover, in FIG. 5, only a single travel lane 300 is shown. In the case that the curved road 300 is a road with one lane on one side (in the case of two lanes), the travel lane 300 is specified by a left end lane marking and a center line lane marking. The same features apply to FIG. 6.

In the comparative example, even if the vehicle 10 reaches a point P11 in proximity to an entrance of the curved road 300, the driver does not initiate a turning operation, and after an alarm is issued (step S13 of FIG. 2) before reaching the point P12, automatic braking is activated (step S16). Along therewith, although the driver steers the vehicle, the vehicle 10 departs (becomes deviated) from the travel lane 300. Thereafter, automatic braking continues at point P13 while the vehicle 10 returns to the travel lane 300.

When the vehicle 10 returns to the travel lane 300 at point P14, the RDM process is terminated and the normal ACC control is restored. Along therewith, in order to enable the vehicle velocity V to reach the target vehicle velocity Vacctar, the travel ECU 38 according to the comparative example causes the vehicle 10 to accelerate. Unlike the present embodiment, in this instance, no limitation is imposed on acceleration. As a result, the vehicle 10 accelerates excessively, and despite the RDM process (steps S13 and S16) having been executed, a departure from the travel lane 300 occurs again (at point P15). Thereafter, automatic braking continues at point P16 while the vehicle 10 returns to the travel lane 300.

When the vehicle 10 returns to the travel lane 300 at point P17 together with traveling through the curved road 300, the RDM process is terminated and the normal ACC control is restored. Along therewith, in order to enable the vehicle velocity V to reach the target vehicle velocity Vacctar, the travel ECU 38 according to the comparative example causes the vehicle 10 to accelerate.

FIG. 6 is a diagram showing movement of the vehicle 10 in the case that the ACC and RDM controls according to the present embodiment are used when the vehicle 10 is traveling on a curved road 300. In the present embodiment, even if the vehicle 10 reaches a point P21 in proximity to an entrance of the curved road 300, the driver does not initiate a turning operation, and after an alarm is issued (step S13 of FIG. 2) before reaching the point P22, automatic braking is activated (step S16 of FIG. 2). Along therewith, although the driver steers the vehicle, the vehicle 10 departs (becomes deviated) from the travel lane 300. Thereafter, automatic braking continues at point P23 while the vehicle 10 returns to the travel lane 300. Up to this point, the process is the same as in the comparative example.

When the vehicle 10 returns to the travel lane 300 at point P24, the RDM process is terminated, and a return process (in this case, the first return process) is performed. In the first return process, the vehicle 10 is accelerated in accordance with a relatively weak limitation on acceleration (see FIG. 4). Thereafter, at points P25, P26, and P27, the vehicle 10 travels through the curved road 300 without departing from the travel lane 300, and the normal ACC control is restored.

Accordingly, in the present embodiment, the vehicle 10 can be turned along the curved road 300 more smoothly than in the comparative example.

<A-3. Advantages and Effects of the Present Embodiment>

As described above, according to the present embodiment, when the RDM process (departure suppression process) is initiated (state ST1→state ST2 of FIG. 2, step S13 of FIG. 3), by limiting the acceleration of the host vehicle 10 (step S14 of FIG. 3), priority is placed on the RDM process rather than on acceleration of the host vehicle 10. Therefore, it is possible to improve the stability of the host vehicle 10 during the RDM process, or to reduce the need for a new RDM process immediately after the RDM process has been performed.

In the present embodiment, when the RDM process (departure suppression process) is completed or interrupted (ST2→ST1 in FIG. 2, step S19 of FIG. 3), the acceleration/deceleration control unit 172 of the ECU 38 relaxes the limitation on acceleration (state ST12 of FIG. 2, steps S23, S24 of FIG. 3). In accordance with this feature, it is possible to reinitiate a normal ACC control (acceleration/deceleration control) at an early stage after the RDM process has been performed.

In the present embodiment, the acceleration/deceleration control unit 172 changes the method of relaxing the limitation on acceleration, depending on the content of the RDM process (departure suppression process) (ST2→ST11, ST111 or ST112 in FIG. 2, steps S20 to S25 of FIG. 3). In accordance with this feature, it is possible to appropriately relax the limitation on acceleration according to the content of the RDM process.

In the present embodiment, the RDM process (departure suppression process) includes automatic braking (step S16 of FIG. 3) for an actual or future departure suppression.

Further, in the case that automatic braking is executed during the RDM process, the acceleration/deceleration control unit 172 changes the method of relaxing the limitation on acceleration (steps S20 to S24 of FIG. 3), depending on an operation history of the automatic brake (presence or absence of operation (step S20 of FIG. 3) and the operation time period Tbrk (step S22)). In accordance with this feature, it is possible to appropriately relax the limitation on acceleration according to the operation history of the automatic brake.

In the present embodiment, the travel ECU 38 (travel control device) is equipped with the AP sensor 80, the BP sensor 82, the steering angle sensor 84, and the steering torque sensor 86 (operation detecting sensor) adapted to detect the presence or absence of a driving operation by a driver (see FIG. 1). Further, the acceleration/deceleration control unit 172 changes the method of relaxing the limitation on acceleration (steps S21, S23, S24 of FIG. 3), depending on the presence or absence of a driving operation during the RDM process (departure suppression process). The presence or absence of a driving operation during the RDM process can be regarded as indicating a degree to which the driver is concentrating on driving. Therefore, it is possible to suitably relax the restriction on acceleration in accordance with the degree to which the driver is concentrating on driving.

In the present embodiment, in the case that automatic braking was executed (step S20 of FIG. 3: YES) and a driving operation was not performed (step S21: NO) during the RDM process (departure suppression process), the acceleration/deceleration control unit 172 changes the method of relaxing the limitation on acceleration depending on the operation time period Tbrk of the automatic brake in the RDM process (steps S22 to S24). The operation time period Tbrk of the automatic brake in the RDM process can be regarded as indicative of the degree of necessity for departure suppression actually or in the future. Therefore, it is possible to appropriately relax the limitation on acceleration in accordance with the degree of necessity for an actual or future departure suppression.

The change in the method of relaxing the limitation on acceleration is a change in an amount of relaxation per unit time (see FIG. 4). In accordance with this feature, by adjusting the time of returning to the normal ACC control (acceleration/deceleration control), it is possible to suitably relax the limitation on acceleration.

In the present embodiment, the acceleration/deceleration control unit 172 increases the amount of relaxation per unit time (step S23, FIG. 4), in the case that automatic braking was executed (step S20: YES) and the driving operation was performed (step S21: YES) during the RDM process, as compared with a case of not performing the driving operation (step S21 of FIG. 3: NO→step S24) during the RDM process (departure suppression process). In accordance with this feature, it is possible to suitably relax the restriction on acceleration in accordance with the presence or absence of a driving operation made by the driver, and the presence or absence of automatic braking.

In the present embodiment, the acceleration/deceleration control unit 172 may increase the amount of relaxation per unit time, in the case that automatic braking is not executed (step S20: NO) during the RDM process, as compared with a case of executing automatic braking (step S20 of FIG. 3: YES) during the RDM control (departure suppression process). In accordance with this feature, in the case that automatic braking is not executed, the vehicle velocity V can be promptly made to reach the target velocity Vacctar.

In the present embodiment, the acceleration/deceleration control unit 172 activates engine braking when limiting the acceleration of the vehicle 10 (step S14 of FIG. 3). Stated otherwise, when acceleration of the host vehicle 10 is limited, the acceleration/deceleration control unit 172 performs a deceleration control to cause the host vehicle 10 to decelerate. In accordance with this feature, by carrying out deceleration while the limitation on acceleration is in progress, the RDM process (deviation suppression process) can be performed in a more suitable manner.

B. Modifications

The present invention is not limited to the embodiment described above, and various modified or additional configurations could be adopted therein based on the content of the present specification. For example, the following configurations can be adopted.

<B-1. Objects to which the Invention can be Applied>

In the embodiment described above, it was assumed that the travel ECU 38 (travel control device) was used in the vehicle 10 such as an automobile (or car) (see FIG. 1).

However, for example, from the standpoint of limiting acceleration of the host vehicle 10 when the RDM process (or a temporary or continuous turning control) is initiated, the present invention is not necessarily limited to this feature. For example, the vehicle 10 (or conveyance) may be a moving object such as a ship, an aircraft, or the like. Alternatively, concerning the vehicle 10, other devices can also be used (for example, various manufacturing devices, or robots).

<B-2. Configuration of Vehicle 10>

[B-2-1. Navigation Device 20]

In the above-described embodiment, the current position Pcur of the vehicle 10 is acquired by the GPS sensor 40 (see FIG. 1). However, for example, from the standpoint of acquiring the current position Pcur of the vehicle 10, the present invention is not limited to this feature. For example, the navigation device 20 (or the vehicle 10) may acquire the current position Pcur from another vehicle in the vicinity of the host vehicle 10 or a stationary device (a beacon or the like) on the side of the road.

[B-2-2. Sensor Groups 22, 24, 26]

The vehicle peripheral sensor group 22 of the above-described embodiment includes the plurality of vehicle exterior cameras 50 and the plurality of radar devices 52 (see FIG. 1). However, for example, from the standpoint of limiting acceleration of the host vehicle 10 when the RDM process (or a temporary or continuous turning control) is initiated, the present invention is not necessarily limited to this feature.

In the case that the plurality of vehicle exterior cameras 50 include a stereo camera adapted to detect a region in front of the vehicle 10, the radar devices 52 can be omitted. Alternatively, in addition to or in place of the vehicle exterior cameras 50 and the radar devices 52, a LIDAR (Light Detection And Ranging) system may be used. Such a LIDAR system continuously irradiates a laser in all directions of the vehicle 10, measures the three-dimensional position of reflection points based on the reflected waves, and outputs the measurements as three-dimensional information Ilidar.

The vehicle body behavior sensor group 24 according to the above-described embodiment includes the vehicle velocity sensor 60, the lateral acceleration sensor 62, and the yaw rate sensor 64 (see FIG. 1). However, for example, from the standpoint of limiting acceleration of the host vehicle 10 when the RDM process (or a temporary or continuous turning control) is initiated, the present invention is not necessarily limited to this feature. For example, it is possible to eliminate one or more of the lateral acceleration sensor 62 and the yaw rate sensor 64.

The driving operation sensor group 26 according to the above-described embodiment includes the AP sensor 80, the BP sensor 82, the steering angle sensor 84, and the steering torque sensor 86 (see FIG. 1). However, for example, from the standpoint of limiting acceleration of the host vehicle 10 when the RDM process (or a temporary or continuous turning control) is initiated, the present invention is not necessarily limited to this feature. For example, it is possible for one or more of the AP sensor 80, the BP sensor 82, the steering angle sensor 84, and the steering torque sensor 86 to be omitted.

[B-2-3. Actuators]

According to the above-described embodiment, the engine 120 and the brake mechanism 130 are used as actuators that serve as targets for the ACC and RDM controls (see FIG. 1).

However, for example, from the standpoint of limiting acceleration of the host vehicle 10 when the RDM process (or a temporary or continuous turning control) is initiated, the present invention is not necessarily limited to this feature. For example, in addition to the engine 120 and the brake mechanism 130, the EPS motor 140 may be the target actuator.

As a case of using the EPS motor 140 in the ACC control, for example, a case exists in which a lane maintenance assist control (LKAS control) is combined with the ACC control. Further, as a case in which the EPS motor 140 is utilized in the RDM control, in addition to automatic braking (step S16 of FIG. 3), automatic steering (or automatic turning) for suppressing a departure from the travel lane may be performed in certain cases. Automatic steering as referred to herein may include not only steering for returning to the travel lane 300 in the event of a departure from the travel lane, but also steering which is performed so as not to cause a departure from the travel lane 300. Moreover, concerning steering (or turning) of the vehicle 10, in addition to using the EPS motor 140, it also is possible to utilize a torque difference (so-called torque vectoring) between the left and right vehicle wheels.

<B-3. Control of the Travel ECU 38>

In the above-described embodiment, when a preceding vehicle exists in the travel lane 300 of the host vehicle 10, the ACC control is used to automatically adjust the interval between the vehicles (see FIG. 2, etc.). However, for example, from the standpoint of limiting acceleration of the host vehicle 10 when the RDM process (or a temporary or continuous turning control) is initiated, the present invention is not necessarily limited to this feature. For example, the present invention can be applied to a cruise control (CC) in which the driver performs acceleration and deceleration operations in relation to the distance from the preceding vehicle.

In the above-described embodiment, descriptions have been given of the ACC control (see FIG. 2) as an automatic driving control in which, concerning acceleration and deceleration of the vehicle 10, driving operations by the driver are not required, whereas, concerning turning (or steering) of the vehicle 10, driving operations by the driver are required. Stated otherwise, the ACC control of the above-described embodiment is an automatic driving technique that assists the driving operations of the driver.

However, for example, from the standpoint of limiting acceleration of the host vehicle 10 when the RDM process (or a temporary or continuous turning control) is initiated, the present invention is not necessarily limited to this feature. For example, the present invention can be applied not only to acceleration and deceleration of the vehicle 10, but also to an automatic operation to automatically carry out turning of the vehicle 10. Stated otherwise, it is possible for the present invention to be applied to automatic driving, which enables traveling without requiring driving operations performed by the driver.

In the above-described embodiment, as a limitation of the ACC control (step S14 of FIG. 3), an engine brake operation was performed. However, for example, from the standpoint of limiting acceleration of the host vehicle 10 when the RDM process (or a temporary or continuous turning control) is initiated, the present invention is not necessarily limited to this feature. For example, at the stage of step S14 of FIG. 3, an automatic brake may be actuated. Moreover, in the case that the vehicle 10 is equipped with a travel motor, it is also possible to carry out regeneration of the travel motor. Alternatively, as a limitation of the ACC control, it is also possible to reduce the target vehicle velocity Vacctar.

In the above-described embodiment, the target vehicle velocity Vacctar of the ACC control is set using the ACC switch 110. However, for example, from the standpoint of limiting acceleration of the host vehicle 10 when the RDM process (or a temporary or continuous turning control) is initiated, the present invention is not necessarily limited to this feature. For example, the target vehicle velocity Vacctar can be set to a vehicle velocity (a legal speed limit or the like) that is read from the map DB 42 corresponding to the current position Pcur. Alternatively, the ECU 38 is capable of setting the target vehicle velocity Vacctar on the basis of a distance between the host vehicle 10 and a preceding vehicle.

In accordance with the RDM control of the above-described embodiment, departure from a travel lane (the travel lane 300 of FIG. 6 or the like) is suppressed with reference to lane markings (the lane markings 302a, 302b, etc., shown in FIG. 6) (steps S12 and S15 of FIG. 3). However, for example, from the standpoint of suppressing a future or actual departure of the host vehicle 10 from the travel lane, the present invention is not limited to this feature. For example, in addition to or instead of the lane markings, it is also possible to suppress departure from the travel lane using pedestrians as a criterion. For example, if a pedestrian crosses the lane markings and enters onto the side of the roadway, the travel lane is set so as to avoid the pedestrian. In addition, a control is possible in which a departure from the travel lane is suppressed.

According to the above-described embodiment, the brake operation time period Tbrk during the RDM process is used (in step S22) as a condition for distinguishing between the first return process (step S23 of FIG. 3) and the second return process (step S24). However, for example, from the standpoint of limiting acceleration of the host vehicle 10 when the RDM process (or a temporary or continuous turning control) is initiated, the present invention is not necessarily limited to this feature. For example, in addition to or instead of the brake operation time period Tbrk, it is also possible to distinguish between the first return process (step S23 of FIG. 3) and the second return process (step S24) by using the number of times that the automatic brake is operated.

In the above-described embodiment, not only the case of returning directly to the normal ACC control immediately after termination of the RDM process (step S20: NO→S25 in FIG. 3), but also the case of returning to the normal ACC control via the first return process (step S23) and the second return process (step S24) have been described. However, for example, from the standpoint of limiting acceleration of the host vehicle 10 when the RDM process (or a temporary or continuous turning control) is initiated, the present invention is not necessarily limited to this feature. For example, it is also possible for only one of the first return process or the second return process to be used. It is also possible to return to the normal ACC control by other methods.

Figure 7:
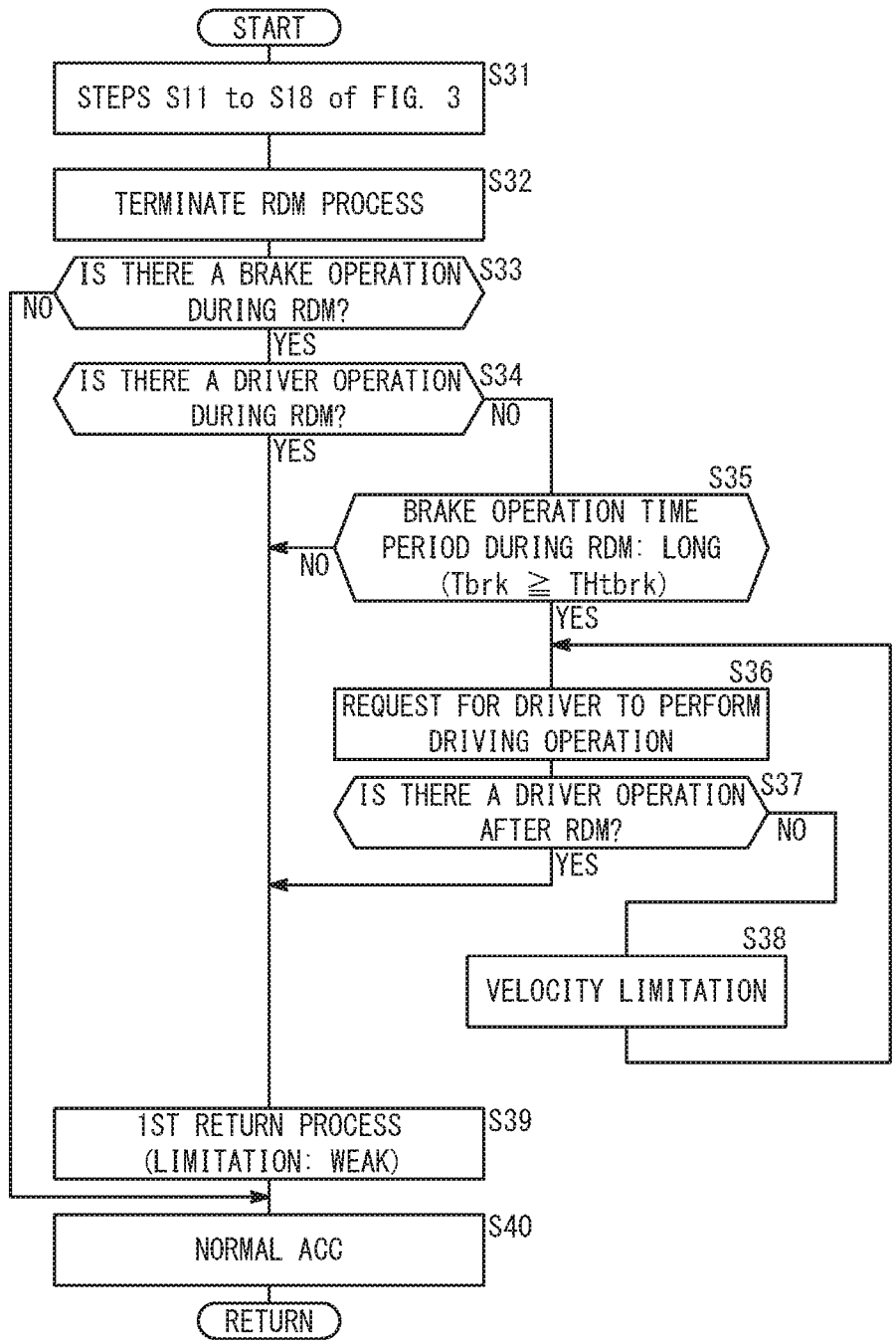
FIG. 7 is a flowchart showing mediation between the ACC and RDM controls in a modified example.

FIG. 7 is a flowchart showing mediation between the ACC and RDM controls in a modified example. In the example of FIG. 7, the limitation on acceleration may be continued until the driving operation of the driver is performed after completion of the RDM process.

In step S31 of FIG. 7, steps S11 through S18 of FIG. 3 are executed. Stated otherwise, the processes of steps S11 to S18 of FIG. 3 are applicable to step S31. Steps S32 to S35, S39, and S40 are the same as steps S19 to S22, S23, and S25 of FIG. 3.

If it is determined in step S35 of FIG. 7 that the brake operation time period Tbrk during the RDM process is long (step S35: YES), the process proceeds to step S36. If the brake operation time period Tbrk during the RDM process is not long (step S35: NO), then the process proceeds to step S39.

In step S36, the ECU 38 makes a request to the driver via the HMI 30 to perform a driving operation. The driving operation referred to herein can include, for example, one of an operation to depress the accelerator pedal 90 and an operation of the steering wheel 94.

In step S37, the ECU 38 determines whether or not there has been a driving operation of the driver after completion of the RDM process (or in other words, based on the request of step S36). The driving operation can be an operation indicative of an acceleration operation or an intention to accelerate by the driver. For example, depression of the accelerator pedal 90 can be used as a driving operation. Alternatively, the operation of the ACC SW 110 that causes an increase in the target vehicle velocity Vacctar of the ACC control may be used as the driving operation in step S37. In the case that a driving operation of the driver is performed after the RDM process (step S37: YES), the process proceeds to step S39. In the case that a driving operation of the driver is not performed after the RDM process (step S37: NO), then the process proceeds to step S38.

In step S38, the ECU 38 limits the vehicle velocity V to a value that is lower than the target vehicle velocity Vacctar of the ACC control (the second return process is performed until the vehicle velocity V reaches the aforementioned low value). After step S38, the process returns to step S36.

If the answer to step S34 is YES and the answer to step S35 is NO, or if the answer to step S37 is YES, then in step S39, the ECU 38 performs the first return process.

According to the modification of FIG. 7, the ECU 38 (travel control device) is equipped with the accelerator pedal 90, the steering angle sensor 84, and the steering torque sensor 86 (operation detecting sensors) adapted to detect the presence or absence of a driving operation by a driver (see FIG. 1). Further, after the RDM process (departure suppression process) has been terminated or suspended (step S32 in FIG. 7), the acceleration/deceleration control unit 172 continues to limit acceleration (step S38) until a driving operation is detected (until the condition of step S37: YES), and relaxes the limitation on acceleration (step S39) when the driving operation is detected (step S37: YES). In accordance with this feature, it is possible to arouse the attention of the driver by continuing to limit the acceleration of the vehicle 10 until the driver concentrates on driving.

According to the modification of FIG. 7, the driving operation in step S37 is an operation indicative of an acceleration operation or an intention to accelerate by the driver. In accordance with this feature, it is possible to accelerate after having first confirmed the intention of the driver to accelerate.

In the above-described embodiment, the first return process and the second return process are performed using the required driving force Fdreq for the travel driving force Fd as a required value (see FIG. 4). However, for example, from the standpoint of making the degree to which the acceleration of the vehicle 10 is limited different, the present invention is not limited to this feature. For example, in the first return process and the second return process, a limitation on the longitudinal acceleration [m/s/s] of the vehicle 10 can be made different.

According to the above-described embodiment, mediation is carried out between the ACC control by the acceleration/deceleration control unit 172, and the RDM control by the RDM control unit 174 (see FIG. 2, etc.). However, for example, from the standpoint of limiting acceleration of the host vehicle 10 when turning of the host vehicle 10 is controlled automatically in a temporary or continuous manner, the present invention is not necessarily limited to this feature. For example, similar to the control of FIG. 3, it is also possible to carry out mediation between the ACC control performed by the acceleration/deceleration control unit 172 and the avoidance control performed by the avoidance control unit 176.

In this case, for example, in step S12 of FIG. 3, the ECU 38 determines whether or not the contact possibility is less than or equal to a first possibility threshold value (for example, whether the TTC is less than or equal to a first TTC threshold value). If the contact possibility is less than or equal to the first possibility threshold value, then in step S13, the ECU 38 issues an alarm as an avoidance process. In the following step S14, the ECU 38 limits the ACC control. Then, in step S15, it is determined whether or not the contact possibility is less than or equal to a second possibility threshold value (for example, whether the TTC is less than or equal to a second TTC threshold value). If the contact possibility is less than or equal to the second possibility threshold value, then in step S16, the ECU 38 actuates the automatic brake. Step S17 is the same as in the above-described embodiment.

In step S18, the ECU 38 determines whether or not the contact possibility is greater than or equal to a third possibility threshold value (for example, whether the TTC is greater than or equal to a third TTC threshold value). Steps S19 to S25 of FIG. 3 are the same as those in the above-described embodiment, except that the RDM process is replaced with an avoidance process.

<B-4. Other Considerations>

In the above-described embodiment, cases exist in which an equal sign is included or not included in the numerical comparisons (step S22 of FIG. 3, etc.). However, for example, if there is no special reason for including or excluding such an equal sign (or stated otherwise, for cases in which the effects of the present invention are obtained), it can be set arbitrarily as to whether to include an equal sign in the numerical comparisons.

As to what this implies, for example, the determination as to whether or not the brake operation time period Tbrk of step S22 of FIG. 3 is greater than or equal to the time threshold value THtbrk (Tbrk THtbrk) can be changed to a determination as to whether or not the brake operation time period Tbrk is greater than the time threshold value THtbrk (Tbrk>THtbrk).

C. Reference Numerals

10: vehicle (host vehicle)
38: ECU (travel control device)
80: accelerator pedal sensor (operation detecting sensor)
84: steering angle sensor (operation detecting sensor)
86: steering torque sensor (operation detecting sensor)
170: periphery recognition unit (travel lane detecting unit)
172: acceleration/deceleration control unit
174: RDM control unit (departure suppression unit)
176: avoidance control unit
180: turning control unit
300: travel lane
Tbrk: brake operation time period
THtbrk: time threshold value
V: vehicle velocity
Vacctar: target vehicle velocity

What is claimed is:

1. A travel control device, comprising:
a processor configured to:
execute an acceleration/deceleration control to automatically carry out acceleration and deceleration of a host vehicle;
detect a travel lane of the host vehicle; and
automatically control turning of the host vehicle;
wherein the automatically control turning of the host vehicle comprises at least one of:
when it is determined that a future or actual departure of the host vehicle with respect to the travel lane will occur or is occurring, to execute a departure suppression control to carry out a departure suppression process to suppress the future or actual departure; and
execute an obstacle avoidance control to carry out an avoidance process to avoid an obstacle that exists in a travel path of the host vehicle;
wherein the departure suppression process or the avoidance process is configured to include automatic braking; and
the processor is configured to change a degree of limitation on acceleration of the host vehicle depending on an operation history of the automatic braking, after termination or suspension of the departure suppression control or the avoidance process.

2. The travel control device according to claim 1, wherein:
the operation history includes at least one of presence or absence of execution of the automatic braking, an operation time period of the automatic brake and a number of operations of the automatic braking during the departure suppression process or the avoidance process.

3. The travel control device according to claim 2, wherein the processor executes:
a first return process to limit acceleration of the host vehicle to a predetermined degree on a condition that the operating time period is shorter than a predetermined time period or the number of operations is smaller than a predetermined number, and
a second return process to limit acceleration of the host vehicle to a degree greater than the predetermined degree on a condition that the operating time period is equal to or longer than the predetermined time period or the number of operations is equal to or greater than the predetermined number.

4. The travel control device according to claim 3, further comprising an operation detecting sensor configured to detect at least one of a stopping operation and a direction changing operation of the host vehicle by a driver;
in a case that at least one of the stopping operation and the direction changing operation was not detected during the departure suppression process or the avoidance process, the processor is configured to change the degree of the limitation on acceleration depending on at least one of the operation time period and the number of operations of the automatic brake in the departure suppression process or the avoidance process.

5. The travel control device according to claim 4, wherein the operation detecting sensor is configured to detect presence or absence of an acceleration operation by a driver;
wherein, after the departure suppression process or the avoidance process has been terminated or suspended, in a case that the operating time period is equal to or longer than the predetermined time period or the number of operations is equal to or greater than the predetermined number, the processor is configured to continue the second return process until the acceleration operation is detected, and execute the first return process when the acceleration operation is detected.

6. The travel control device according to claim 4, wherein the processor is configured to execute the first return process in a case that at least one of the stopping operation and the direction changing operation was detected during the departure suppression process or the avoidance process.

7. The travel control device according to claim 5, wherein, after the departure suppression process or the avoidance process has been terminated or suspended, in a case that the operating time period is equal to or longer than the predetermined time period or the number of operations is equal to or greater than the predetermined number, the processor is configured to continue the second return process by limiting a vehicle velocity to a value that is lower than a target vehicle velocity until the acceleration operation is detected.

8. The travel control device according to claim 1, wherein, when limiting the acceleration of the host vehicle, the processor is configured to perform a deceleration control to cause the host vehicle to decelerate, or perform a braking control for generating a braking force with respect to the host vehicle.

9. The travel control device according to claim 1, wherein the processor is configured to limit the acceleration until a vehicle velocity of the host vehicle returns to a target vehicle velocity.

10. A travel control method in which a travel control device is used, wherein the travel control device is configured to execute:
an acceleration/deceleration control to automatically carry out acceleration and deceleration of a host vehicle; and
a turning control to automatically control turning of the host vehicle;
wherein the turning control includes at least one of:
a departure suppression control which, when it is determined that a future or actual departure of the host vehicle with respect to a travel lane of the host vehicle will occur or is occurring, carries out a departure suppression process to suppress the future or actual departure; and
an obstacle avoidance control which carries out an avoidance process to avoid an obstacle that exists on a travel path of the host vehicle;
wherein the departure suppression process or the avoidance process is configured to include automatic braking; and
a degree of limitation on acceleration of the host vehicle is changed depending on an operation history of the automatic braking, after termination or suspension of the departure suppression process or the avoidance process.

* * * * *